United States Patent [19]
Ihara

[11] Patent Number: 5,630,694
[45] Date of Patent: May 20, 1997

[54] INTEGRATED CONTAINER HANDLING SYSTEM

[75] Inventor: Toshimichi Ihara, Ise, Japan

[73] Assignees: Shinko Electric Co., Ltd.; Japan Air System Co., Ltd., Tokyo, Japan

[21] Appl. No.: 699,714

[22] Filed: Aug. 27, 1996

Related U.S. Application Data

[63] Continuation of Ser. No. 293,891, Aug. 22, 1994, abandoned.

[51] Int. Cl.$^6$ ................................................ B65G 67/02
[52] U.S. Cl. ........................ 414/495; 414/373; 244/137.1
[58] Field of Search .................... 244/137.1; 414/347, 414/495, 496, 373, 917, 497, 592, 654, 660, 609; 182/141; 187/9 R, 9 E, 18, 8.59, 8.71

[56] References Cited

U.S. PATENT DOCUMENTS

| | | | |
|---|---|---|---|
| 3,666,127 | 5/1972 | Guyaux | 414/347 |
| 3,850,283 | 11/1974 | Nordstrom | 198/88 |
| 3,944,096 | 3/1976 | Carder | 214/512 |
| 4,306,830 | 12/1981 | le Duc | 414/343 |
| 4,541,768 | 9/1985 | Walker et al. | 244/137.1 |
| 4,701,097 | 10/1987 | Sturtz | 244/137.1 |

FOREIGN PATENT DOCUMENTS

| | | | |
|---|---|---|---|
| 2225435 | 1/1973 | Germany . | |
| 3015420 | 10/1981 | Germany | 244/137.1 |
| 2053157 | 2/1981 | United Kingdom . | |
| 2113175 | 8/1983 | United Kingdom . | |

*Primary Examiner*—Galen L. Barefoot
*Attorney, Agent, or Firm*—Scully, Scott, Murphy & Presser

[57] ABSTRACT

An integrated air cargo/container handling system is presented in which the motive power section and the container handling section are integrated. Unlike the conventional system which requires coordination of three handling units (the power section, a transport section and a loading section) and separate operators for loading and unloading of containers, the present handling system has only two sections: the motive power section and the container handling section. The container handling section includes three elevators: a front elevator, a middle elevator and a back elevator. At the cargo terminal, eight containers are loaded onto the handling system using the back elevator and the middle elevator, and the containers are secured on the back and middle elevators. The handling system is driven to a target aircraft at a speed of up to 50 Km/hr, and the front elevator is positioned in place at the cargo bay of the aircraft. The front and the middle elevators, in conjunction with an assisting elevator if necessary, transfer the containers from the middle elevator to the front elevator and into the aircraft. The containers from the back elevator are transferred to the middle elevator and loaded into the aircraft. The handling system is operated with one operator who makes all the necessary decisions about the movement of each container, thus greatly facilitating loading and unloading of the container to and from the aircraft and cargo terminals.

8 Claims, 6 Drawing Sheets

INTEGRATED CONTAINER HANDLING SYSTEM

This is a continuation of application Ser. No. 08/293,891 filed on Aug. 22, 1994, now abandoned.

BACKGROUND OF THE INVENTION

1. Field of the Invention

The present invention relates in general to vehicles for transporting goods, and relates in particular to an integrated system for transporting and handling containers between aircraft and cargo terminals.

2. Technical Background

With increasing global trade, there is a trend towards increased use of containers at air terminals. The system for handling containers between an aircraft and cargo terminals has remained largely static for the past decade in spite of the increase in the number of containers being handled. Therefore, there has been a growing need to improve the efficiency of handling containers at air terminals.

For example, an existing system for handling containers at air terminals is described in a Japanese Patent Application, First Publication, S56-57532 (corresponding US priority application 82186, Oct. 5, 1979). The container handling system disclosed in this patent, illustrated in FIG. 6, includes a plurality of container dollys 2, each having a container 1 loaded thereon, being pulled by a small puller car 3. When the containers 1 are to be loaded onto the aircraft 4, a containers 1 loaded on a dolly 2 must first be transferred from the dollys 2 to the platform of a container loader 5 parked alongside the aircraft 4. The container 1 is then lifted by the loader 5 to the level of the cargo bay of the aircraft, and the container 1 is loaded into the cargo bay of the aircraft 4.

In the cargo handling system presented above, there are many deficiencies which affect the overall performance of the system. First, three operating components are involved in loading a container, and at least two operators are needed, one to operate the puller car 3, one to unload the container from the dolly 2 to the platform of the elevator 5, and possibly one more operator to operate the elevator 5. Next, it is necessary that after the completion of loading of the container from one dolly 2, each of the succeeding dollies 2 must be maneuvered into place for loading a next container. This type of handling system greatly reduces the operating efficiency of the entire container handling system. Further, the puller car 3 moves at a low speed of about 15 Km/hr thus limiting the overall handling capacity of the cargo handling system. An additional problem is caused by the potential for increased chances for a breakdown in two separate power sources needed for the system, i.e., container loader 5 having its own power source, the container dollys 2 which is powered by a puller car 3. Because these power sources are separate, a breakdown in one power source will make the entire system disfunctional, thus affecting the overall performance of the system.

SUMMARY OF THE INVENTION

The primary objective of the handling system of the present invention is to simplify the operating components of an air cargo/container handling system so as to facilitate handling of containers at airports.

This objective is achieved in an integrated container handling system for handling a plurality of containers at airport for loading and unloading the plurality of containers to and from an aircraft and cargo terminals, comprising: a motive section including a transport vehicle having a driver section; and a container handling section integrally associated with the motive section, comprising a chassis operatively connected with the transport vehicle: wherein the chassis is provided with a front elevator having a pivotable assisting elevator; a middle elevator; a back elevator; each of the elevators having a platform for handling the plurality of containers including forward/reversing rollers, sideways transfer rollers, free rollers and free balls.

An integrated handling system for air cargo container presented above offers significant advantageous over the conventional handling system, because it comprises a power section and a transport section, having an integrated loading section for loading and unloading of the containers by one operator. The entire handling system comprises only two sections: the motive power section and the container handling section. The container handling section includes three elevators: a front elevator, a middle elevator and a back elevator. At the cargo terminal, eight containers are loaded onto the handling system using the back elevator and the middle elevator. The handling system with the container loaded on the middle and back elevators is driven to a target aircraft at a speed of up to 50 Km/hr, and the front elevator is positioned in place at the cargo bay of the aircraft. The front and the middle elevators, in conjunction with an assisting elevator, if necessary, transfer the containers from the handling system to the aircraft. The handling system, therefore, is operated with one operator who makes all the necessary decisions about the movement of each container, thus greatly facilitating loading and unloading of the container to and from the aircraft and cargo terminals.

PREFERRED EMBODIMENTS

A preferred embodiment of the present invention will be explained with reference to FIGS. 1 to 5.

Figure 1:
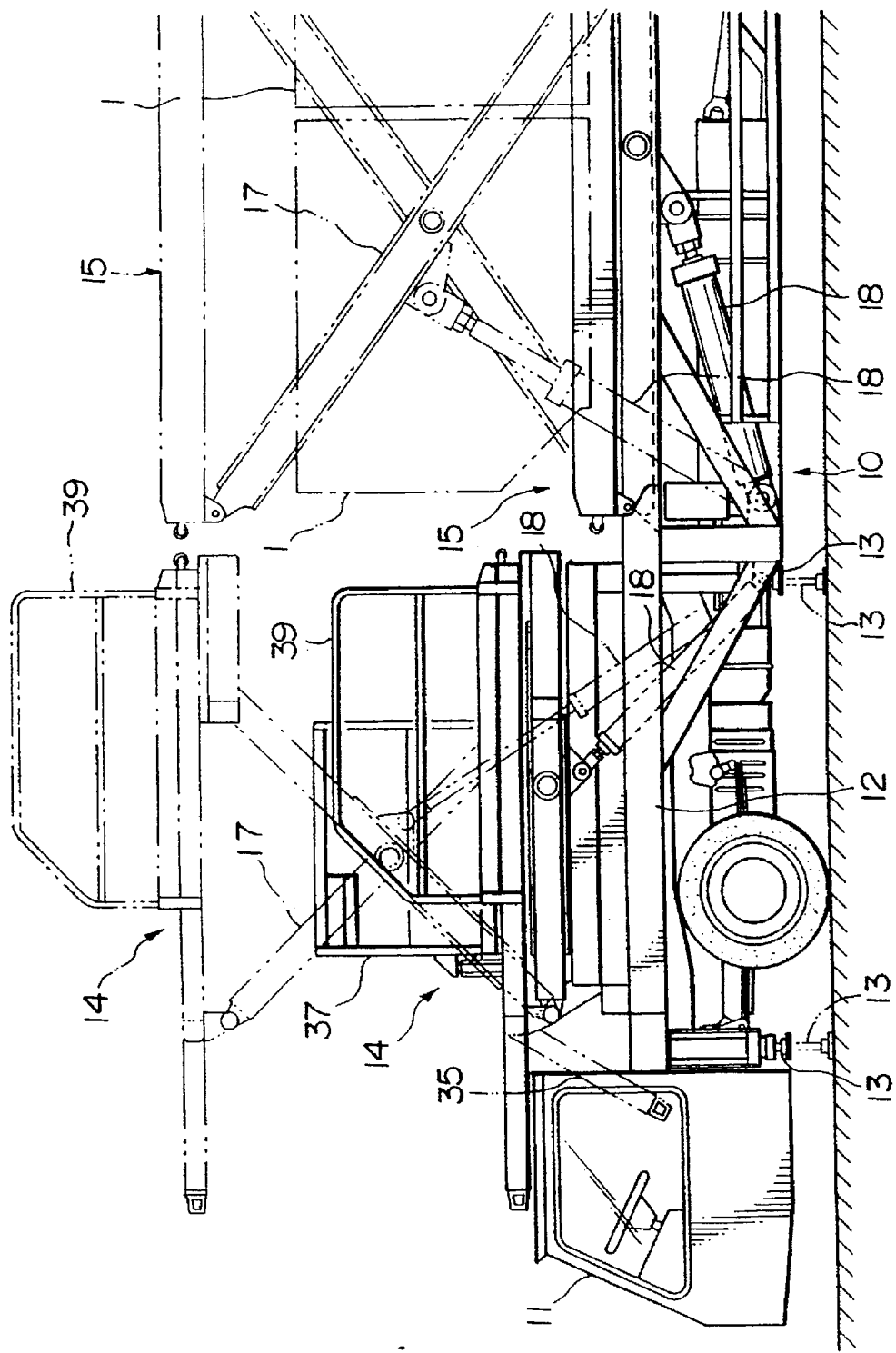
FIG. 1 is a side view of a front half of an embodiment of the container handling system of the present invention.

The container handling system comprises: a motive power section comprising a transport vehicle 10 having a driver section 11 disposed in the front part of the handling system, as shown in FIG. 1; and a container handling section, for loading/unloading of the containers 1, disposed in the rear part of the handling system. The container handling section comprises a chassis 12 having three elevators disposed thereon for handling the containers 1. There is a pair of vertically adjustable front and rear stabilizers 13 provided on the chassis 12, which are placed in the down position to provide stability to the vehicle 10 during loading/unloading stages of the operation. The power section provides power to drive the transport vehicle 10 as well as to operate each of the three elevators in the container handling section. An internal combustion engine is used to drive a fluid circuit which operates the wheels of the transport vehicle 10 by means of a direct drive or through such device as a torque converter.

Figure 3:
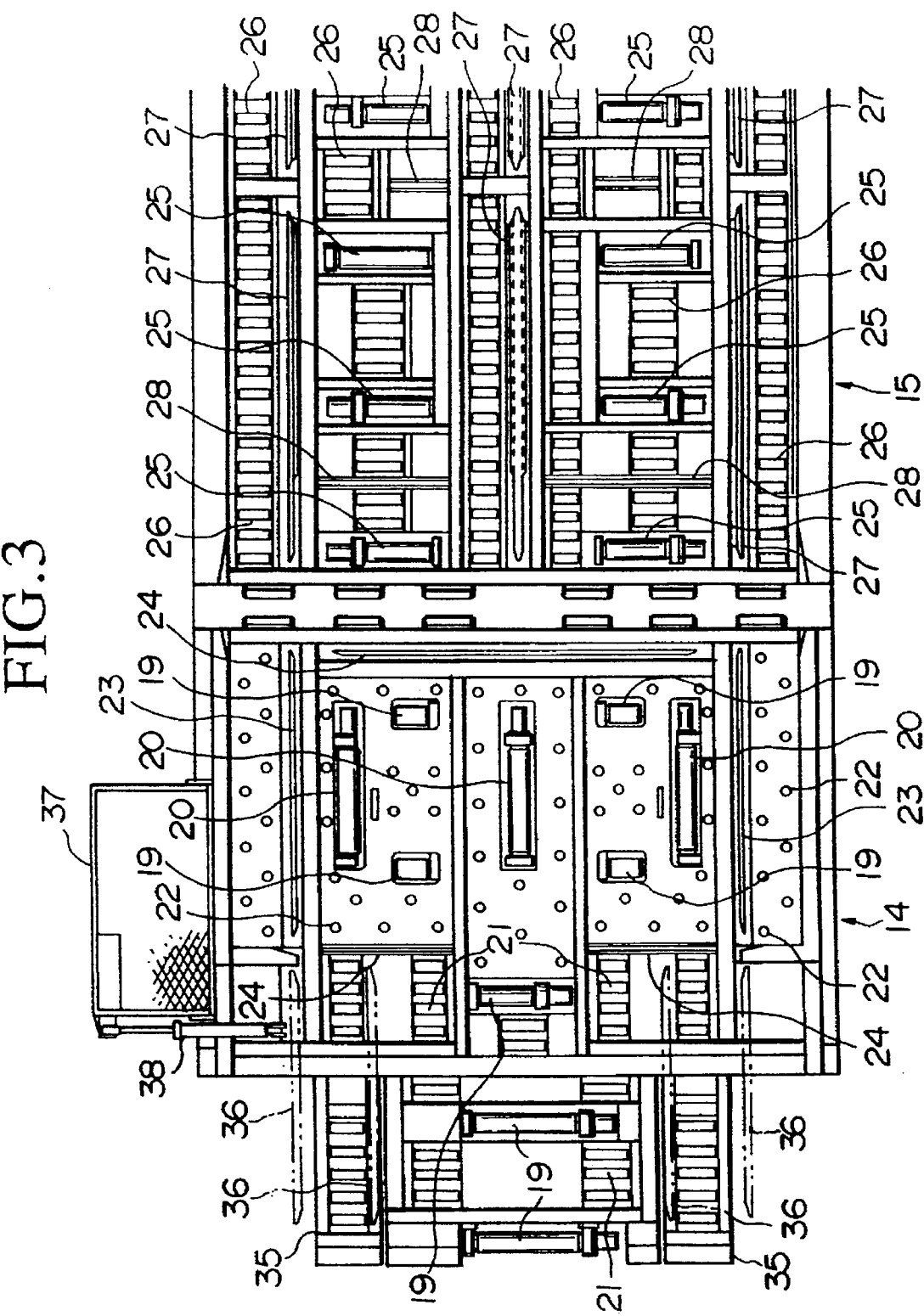
FIG. 3 is a plan view of the handling system shown in FIG. 1.
Figure 4:
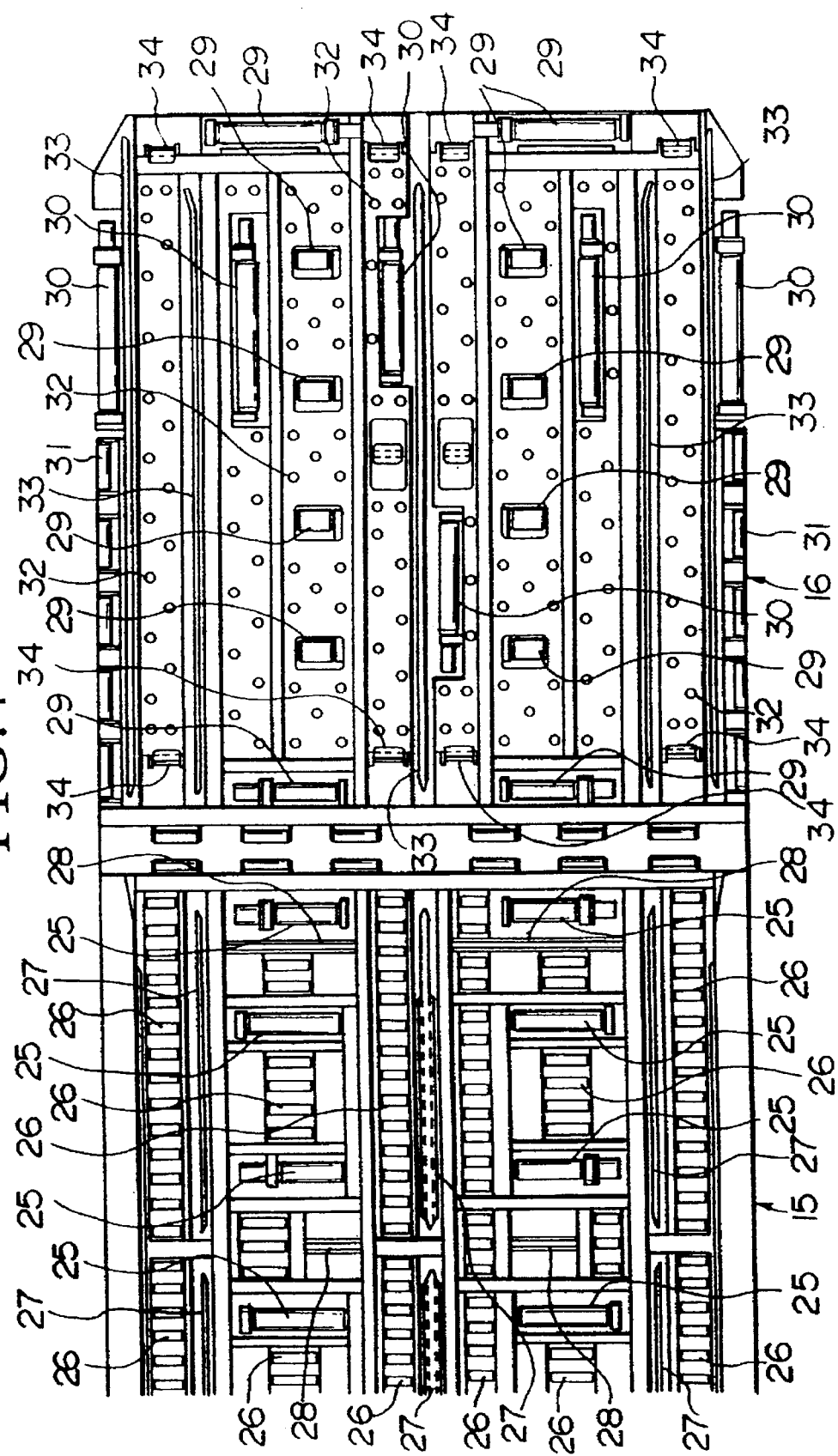
FIG. 4 is a plan view of the handling system shown in FIG. 2.

On top of the chassis 12, there are disposed three independently operated elevators: a front elevator 14; a middle elevator 15; and a back elevator 16. The platform of the elevators 14, 15 and 16 are provided with rollers and balls, as shown in FIGS. 3 and 4, to facilitate the movement of the containers on the platform. The platform for the back elevator 16 is at a fixed height, and the containers at the ground level are lifted and loaded either from the rear part or the side part of the elevator 16 by suitable means such as forklift.

Figure 2:
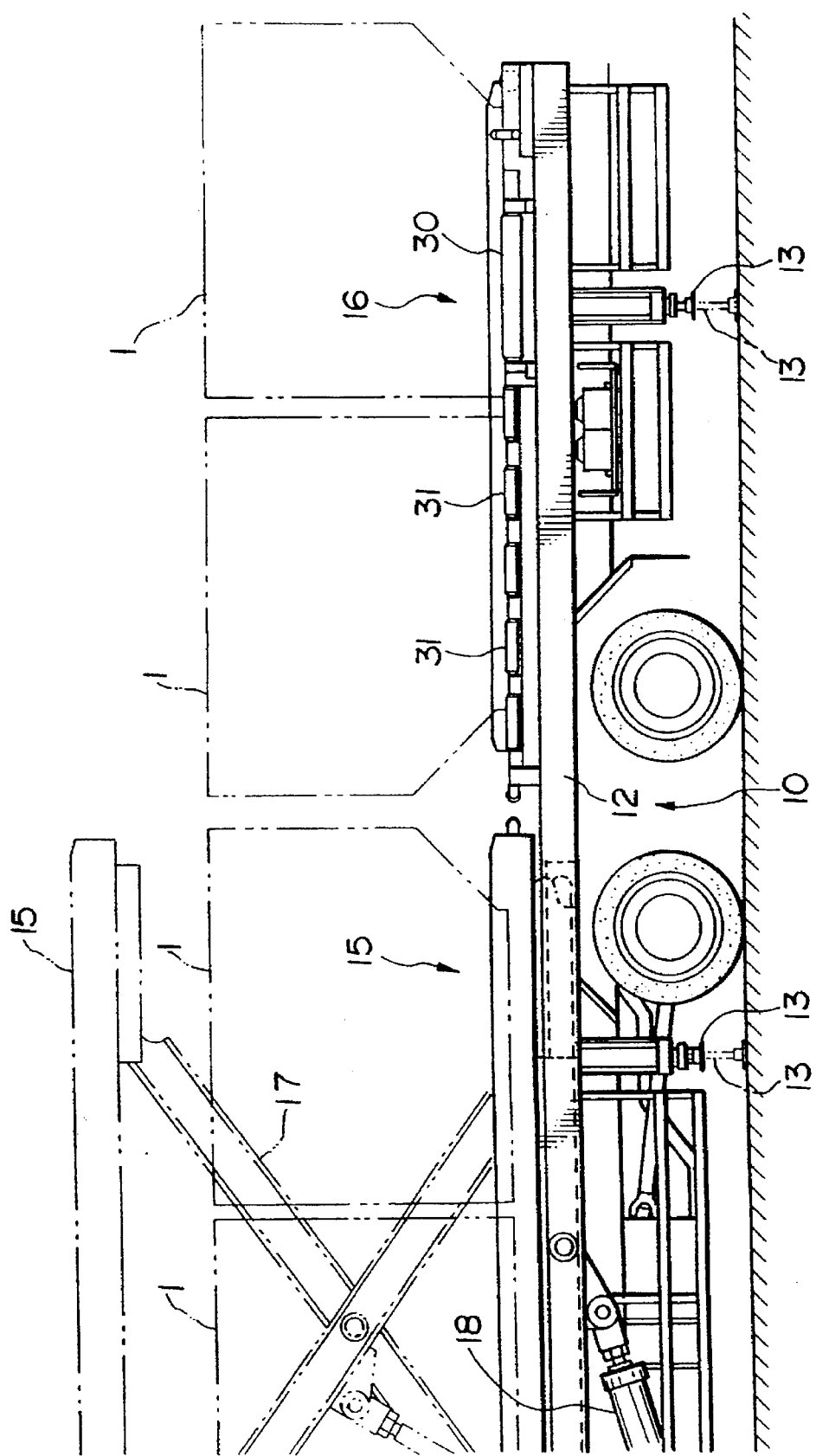
FIG. 2 is a side view of a back half of the container handling system shown in FIG. 1.

As shown in FIGS. 1 and 2, the front and middle elevators 14, 15 are movable vertically by means of a scissors link 17 and a lifting cylinder 18. A plan view of the front elevator 14 in FIG. 3 shows that a platform of the front elevator 14 comprises: forward/reverse (F/R) transfer rollers 19 for moving the container 1 forward or backward (i.e., in the longitudinal direction of the handling system); sideways transfer rollers 20 for moving the container 1 sideways; free rollers 21 and free balls 22 for supporting the container 1 and facilitating their movement; guide rails 23 for guiding the container 1 forward or backward; and stoppers 24 for stopping the container 1 at a specific position.

Similarly, with reference to FIGS. 3 and 4, the middle elevator 15 comprises: forward/reverse (F/R) transfer rollers 25; free rollers 26; guide rails 27; and stopper 28. The back elevator 16 comprises F/R transfer rollers 29; sideways transfer rollers 30; free rollers 31; free balls 32; guide rails 33; and container locks 34 for fixing the container 1 in position. The guide rails 23, 27 and 33, the stoppers 24 and 28 are disposed so as to enable protruding or retracting vertically with respect to the chassis 12.

Additionally as shown in FIGS. 1 and 3, there is a pair of assisting elevators 35 disposed on the left and right of the front elevator 14. One end of the left and right assisting elevators is fixed to the front elevator 14 so that the free end is able to pivot freely about its fixed end as illustrated in FIG. 1. The assisting elevators 35 are folded in the down position normally, and when they are needed, i.e., when the opening width of the cargo bay of the aircraft is wider than the standard width of the front elevator 14 which buts up against the cargo bay opening, they are placed in position manually. On both sides of the assisting elevator 35, there are provisions to dispose replaceable guide rails 36 as well as hand rails 39.

In the above embodiment, an operating stand 37, which is freely rotatable by means of a storage cylinder 38, is disposed on the leading end of the front elevator 14. In this embodiment, during the transport of the handling system, the operating stand 37 is folded flat in the storing position by raising and rotating the storing cylinder 38 through an angle of 90° about the storage cylinder 38 so as to fold the operating stand flat on the platform. The operator stand 37 is provided with all the necessary controls for controlling the operation of the elevators 14, 15 and 16 as well as F/R transfer rollers 25, sideways transfer rollers 30, stoppers 24, 28.

In another embodiment, the operator stand is provided with an additional control function for driving the transport vehicle 10. In this embodiment, the operator is able to stand on the operator stand to complete loading/unloading operations, and after lowering the front and middle elevators 14, 15, the entire handling system is transported across the airport ground with the operator remaining in the operator stand, and steering the handling system from the operator stand.

The operation of the container handling system will be explained next. In the following description, the exact position of the operator is not being specified, but it is understood that one operator manipulates all the functions of the handling system.

At a cargo terminal, the containers 1 are loaded onto the back elevator 16 and are successively moved to the middle elevator 15. The steps are as follows: first a container 1 is loaded onto the back elevator 16, and this container 1 is moved forward to the middle elevator 15 by operating the F/R transfer rollers 25 of the middle elevator 15 and the F/R transfer rollers 29, the sideways transfer roller 30 of the back elevator 16 while supporting the container 1 by means of the free rollers 26, 31 of the middle elevator 15 and the free balls 31 of the back elevator 16. This step is repeated until each of the elevators 15, 16 has been loaded with four containers, making a total number of containers transported per trip to be eight containers.

At this stage, the unneeded components such as the guide rails 27, 33, stopper 28 and container lock 34 are disposed in the stand-by position below the container moving plane so as not to interfere with the movement of the containers 1. The necessary components such as the guide rails 27, 33, stopper 28, and the container lock 34 are made to protrude out above the platform. It should be noted that it may not always be necessary to operate the sideways transfer rollers 30 if the container 1 can be loaded without lateral movement.

Next, when all the containers 1 are loaded onto the middle and back elevators 15, 16, the guide rails 27, 33 are placed in the stand-by position below the platform, and the stopper 28 and the container lock 34 are operated to firmly secure the containers 1 on the elevators 15, 16, after which the transport vehicle 10 is operated at a relatively high speed (about 50 Km/hr) to arrive at the aircraft 4.

Figure 5:
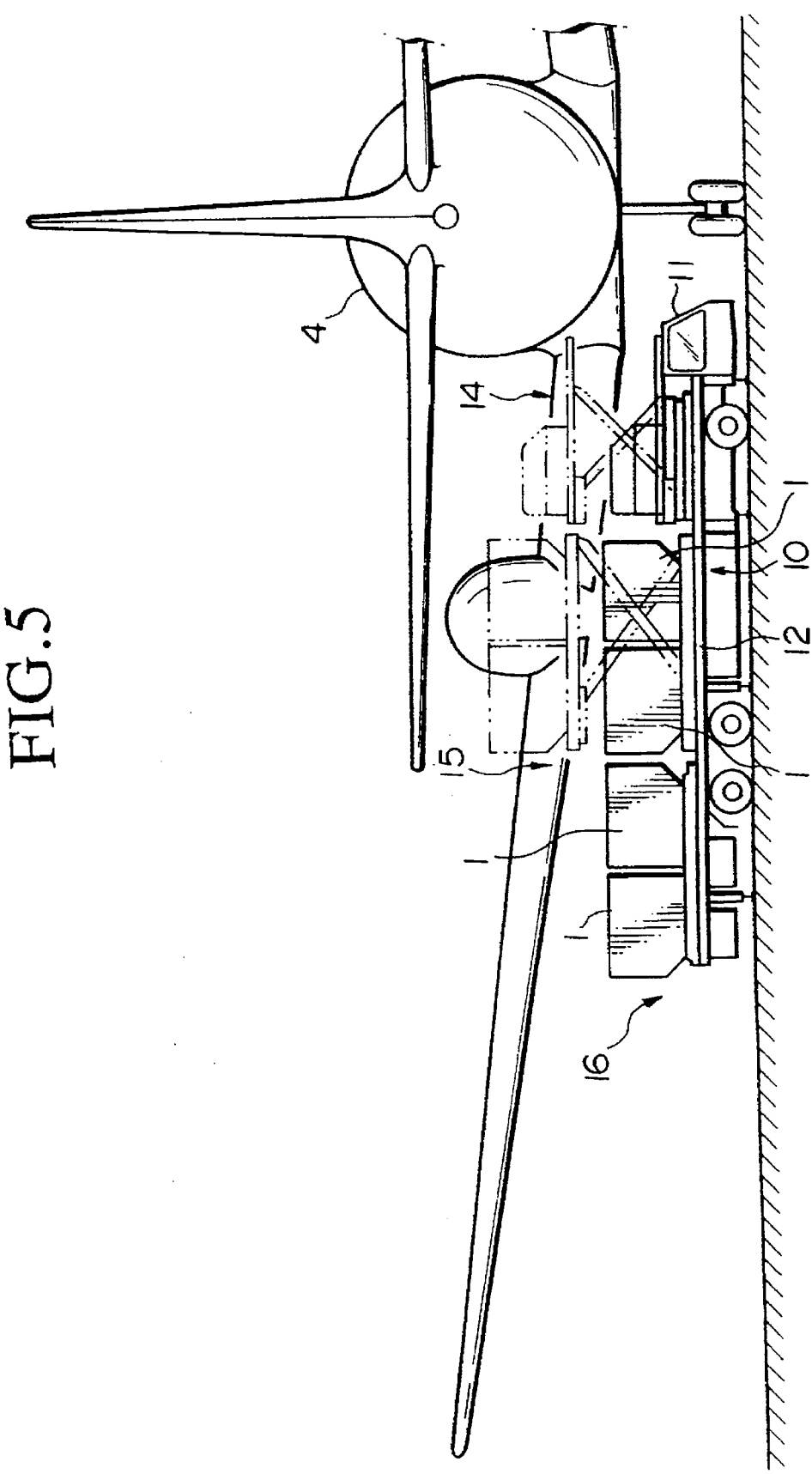
FIG. 5 is an illustration of the container handling system of the present invention being used to load containers on an aircraft.
Figure 6:
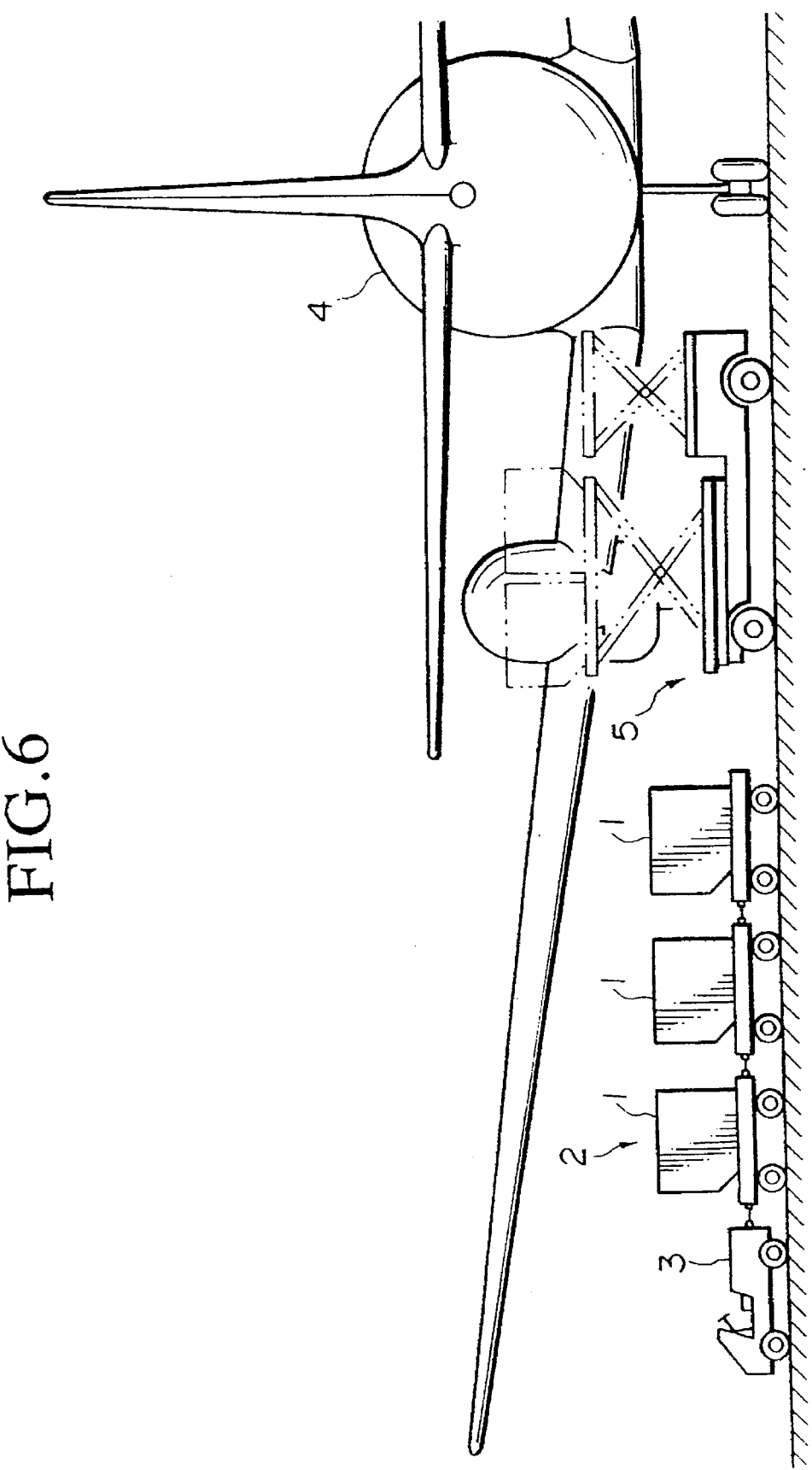
FIG. 6 is an illustration of a conventional system of handling containers being used to load containers on an aircraft.

Upon arrival at the target aircraft 4, the transport vehicle 10 is maneuvered and positioned in the unloading position, as shown in FIG. 5, so that the front elevator 14 is at a suitable height for unloading the containers 1 into the cargo bay of the aircraft (4). The lifting cylinders 18 are operated to raise the front and middle elevators 14, 15 to the unloading level to position the elevators 14, 15 appropriately level with the receiving platform of the cargo bay of the aircraft 4. The front elevator 14 is empty at this stage, and the middle and back elevators 15, 16 are fully loaded with containers 1. The containers 1 are moved from the middle elevator 15 to the front elevator 14 by operating the F/R transport rollers 19 and 25 of the front and middle elevators 14, 15 as well as the sideways transport rollers 20 of the front elevator 14. The stoppers 24, 28 are operated as necessary during the transfer process of the containers from the middle elevator 15 to the front elevator 14, and the subsequent loading process into the cargo bay of the aircraft. This transfer and loading step is repeated until all the four containers 1 disposed on the middle elevator 15 are loaded into the aircraft 4.

In the operation described above, if the width of the cargo bay of the aircraft 4 is wider than the width of the front elevator 14, it may be necessary to position the assisting elevator 35 in place manually by swinging the assisting elevator 35 level with the receiving platform of the aircraft 4 to fill the extra space. It is also necessary to vary the position of the guide rails 36 depending on whether the assisting elevator 35 is being used or not.

When all the four containers 1 from the middle elevator 15 are loaded onto the aircraft 4, the now empty middle elevator 15 is lowered to carry out the transfer operation of transferring the containers 1 disposed on the back elevator 16 to the middle elevator 15. The transfer operation is carried out in much the same way as the transfer of containers from the middle elevator 15 to the front elevator 14, and will not be repeated. When the middle elevator 15 is filled with four containers 1, the middle elevator 15 is again raised to the level of the front elevator 14, and the loading steps described previously are repeated until all the four containers 1 are transferred from the middle elevator 15 to the front elevator 14 and loaded into the aircraft 4.

The series of steps presented above completes the sequence of events beginning with loading of containers 1 at a cargo terminal, and ending in unloading of the containers 1 from the transport vehicle 10 to the aircraft 4 for a round of trip from the cargo terminal to the aircraft 4.

The series of steps for loading of the container 1 from the aircraft 4 and unloading at a cargo terminal will be similar but in reverse order to those presented above.

In summary, the front elevator of the transport system is designed to operate in conjunction with the aircraft with or without the use of the assisting elevator platform as necessary. The back elevator platform is designed to operate in conjunction with the cargo terminal for receiving the loads from the cargo terminal and storing a half the load during transport. The middle elevator platform acts both as storage space for half the containers as well as an intermediate transfer platform functioning to transfer the containers to the either the front or the back elevator.

The present invention of handling system was illustrated with reference to a preferred embodiment and its modified model. It will be apparent that other modifications and variations are possible without departing from the principle described above. For example, the size of any of the front, middle or back elevator which basically function as loading, holding or unloading elevators, are not limited to the illustrated embodiment. The size of the elevators can be modified depending on the power and the size of the transporting vehicle chosen.

What is claimed is:

1. An integrated container handling system for loading and unloading a plurality of containers, comprising a transport vehicle, and in a line on a chassis of said transport vehicle having a front elevator, a middle elevator, and a rear elevator;

said chassis of said transport vehicle including a stabilizer which is freely raisable and lowerable;

said front elevator platform being provided with forward/backward rotatable transfer rollers for moving containers forward or backwards, sideways transfer rollers for transferring containers sideways, freely-rotatable rollers and freely-rotatable balls for supporting containers, guide rails, which are freely raisable and lowerable for guiding containers forward and backward, and a stop bar, which is freely raisable and lowerable retaining containers in fixed positions;

said middle elevator platform and said rear elevator platform including container locks which are freely raisable and lowerable for fixing containers in place, said forward/backward transfer rollers, said side transfer rollers, said freely-rotatable rollers, said freely-rotatable balls, and said guide rails, and a plurality of containers can be loaded on each of said middle elevator platform and said rear elevator platform;

the front of opposite sides of said forward elevator platform being provided with an auxiliary platform which is upwardly and downwardly swingable; and one side of said forward elevator platform being provided with an operating stand which freely moves up and down.

2. An integrated container handling system according to claim 1, wherein the number of containers which can be loaded onto said middle elevator platform and said rear elevator platform is four for each said platform.

3. A handling system as claimed in claim 1, wherein said chassis is provided with a pair of front stabilizers and a pair of rear stabilizers.

4. A handling system as claimed in claim 1, wherein an elevation of said middle elevator is adjustable so as to be about level with said front elevator as well as with a cargo receiving bay of an aircraft.

5. A handling system as claimed in claim 1, wherein said front elevator is positioned adjacent to an aircraft during unloading of said containers from said container handling system, and functions as a container unloading device in association with an assisting elevator.

6. A handling system as claimed in claim 1, wherein said middle elevator functions as both a storage space for said plurality of containers during transporting of said containers as well as means for transferring said plurality of containers from said handling system to an aircraft.

7. A handling system as claimed in claim 1, wherein said back elevator functions as both a storage space for said plurality of containers during transporting of said containers as well as means for loading/unloading said plurality of containers to and from cargo terminals.

8. A handling system as claimed in claim 1, wherein said transport vehicle operates at a ground speed of up to about 50 Km per hour.

* * * * *